(12) United States Patent
Nam et al.

(10) Patent No.: US 12,376,121 B2
(45) Date of Patent: Jul. 29, 2025

(54) RULES FOR MULTI-SLOT PHYSICAL DOWNLINK CONTROL CHANNEL (PDCCH) MONITORING IN COMMON SEARCH SPACE SETS

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 17/860,819

(22) Filed: Jul. 8, 2022

(65) Prior Publication Data

US 2023/0224911 A1 Jul. 13, 2023

Related U.S. Application Data

(60) Provisional application No. 63/298,576, filed on Jan. 11, 2022.

(51) Int. Cl.
  *H04W 72/23* (2023.01)
  *H04L 5/00* (2006.01)
  *H04W 48/12* (2009.01)

(52) U.S. Cl.
  CPC ............. *H04W 72/23* (2023.01); *H04L 5/001* (2013.01); *H04L 5/0053* (2013.01); *H04L 5/0094* (2013.01); *H04W 48/12* (2013.01)

(58) Field of Classification Search
  CPC ...... H04W 72/23; H04W 48/12; H04L 5/001; H04L 5/0053; H04L 5/0094
  See application file for complete search history.

(56) References Cited

U.S. PATENT DOCUMENTS

| | | | |
|---|---|---|---|
| 2020/0389874 A1 | 12/2020 | Lin et al. | |
| 2023/0052616 A1* | 2/2023 | Lin | H04W 72/23 |
| 2023/0136739 A1* | 5/2023 | He | H04W 72/232 370/329 |
| 2023/0147905 A1* | 5/2023 | Li | H04W 72/232 370/329 |
| 2023/0155873 A1* | 5/2023 | Yao | H04L 27/26025 370/329 |

OTHER PUBLICATIONS

International Search Report and Written Opinion—PCT/US2022/051710—ISA/EPO—May 8, 2023.
(Continued)

*Primary Examiner* — Chandrahas B Patel
(74) *Attorney, Agent, or Firm* — QUALCOMM Incorporated

(57) ABSTRACT

Certain aspects of the present disclosure provide techniques for a method of wireless communication by a user equipment (UE), comprising receiving, from a network entity, signaling configuring: 1) a minimum physical downlink control channel (PDCCH) monitoring periodicity that spans a number of slots associated with a slot group, and 2) monitoring occasions (MOs) of different types of common search spaces (CSSs) within the slot group, selecting at least one MO, from the MOs of the different types of CSSs, to monitor based on a rule, and monitoring the at least one MO for a PDCCH from the network entity.

20 Claims, 12 Drawing Sheets

(56) References Cited

OTHER PUBLICATIONS

Qualcomm Incorporated: "PDCCH Monitoring Enhancements", 3GPP TSG-RAN WG1 #107-e, R1-2112204, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021- Nov. 19, 2021, Nov. 6, 2021, pp. 1-8, XP052075310, Paragraph [2.1.3], Figures 1a, 1b, 1c.

* cited by examiner

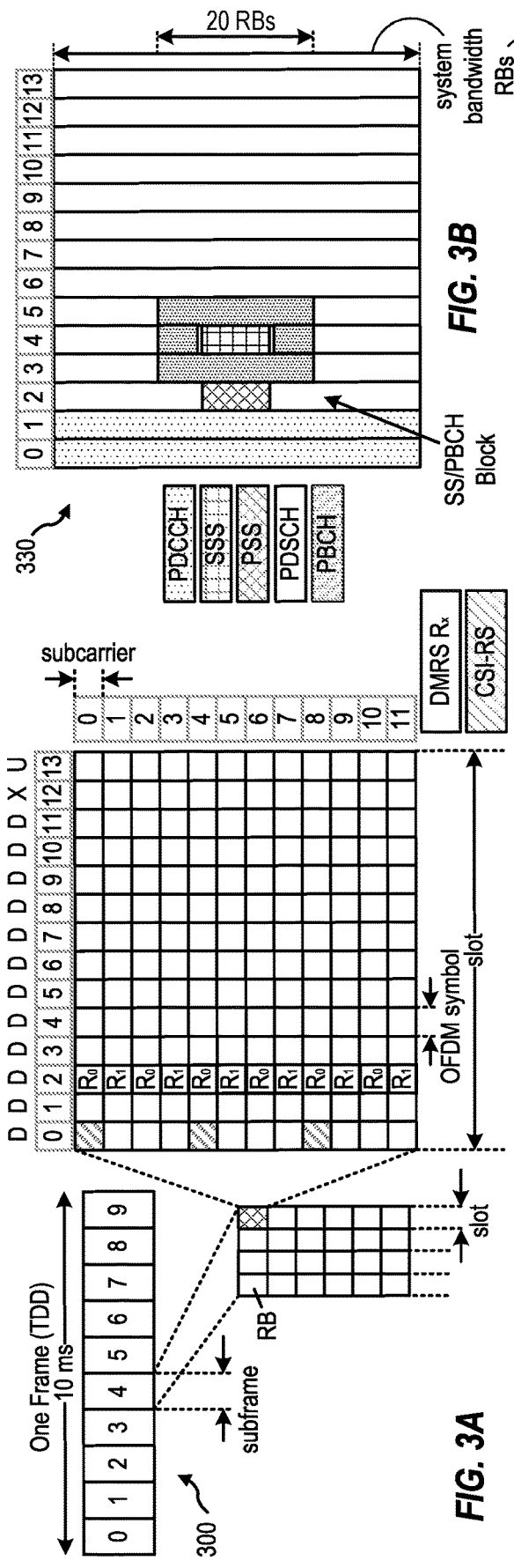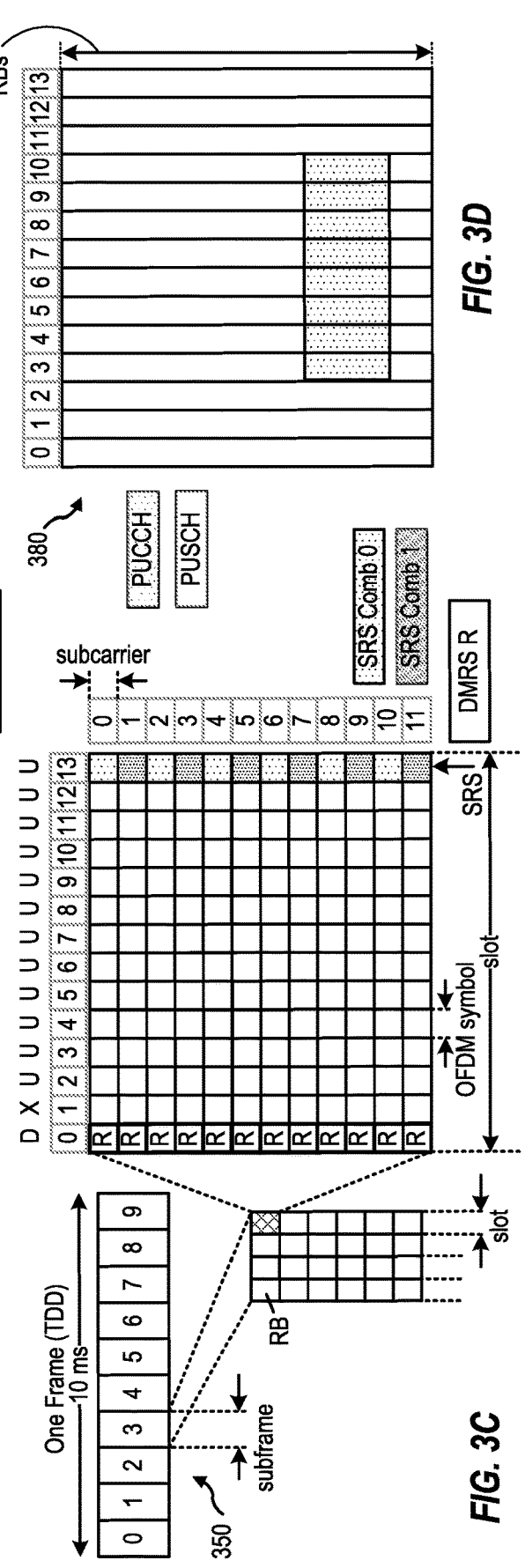
FIG. 3A
FIG. 3B
FIG. 3C
FIG. 3D (a) Micro- sleep with cross slot scheduling
(b) Microsleep w/o cross- slot scheduling

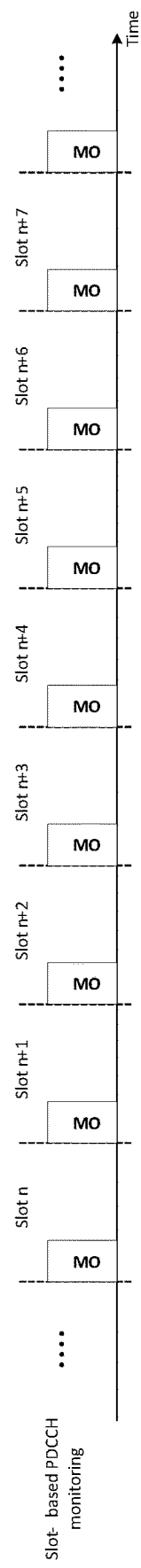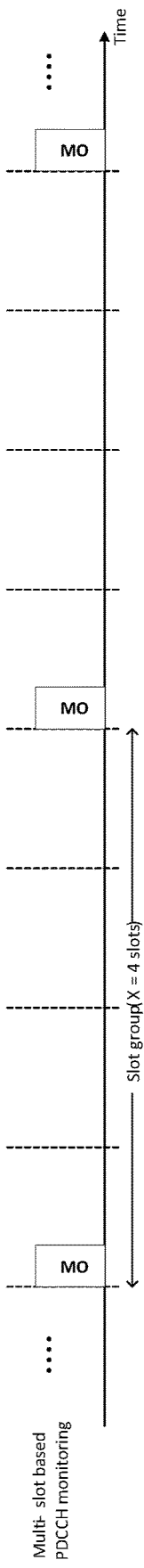
FIG. 5A
FIG. 5B

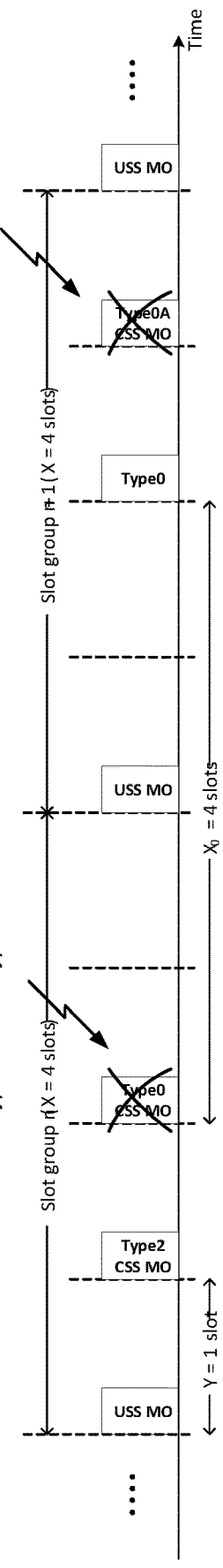
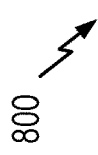
FIG. 8

```
                                         ┌──────────────────────────────────┐
                                         │ A METHOD OF WIRELESS COMMUNICATION BY A USER │
                                         │            EQUIPMENT (UE)        │
                                         └──────────────────────────────────┘
                                                        │
                                                        ▼                                910
┌─────────────────────────────────────────────────────────────────────────────────────┐
│ RECEIVE, FROM A NETWORK ENTITY, SIGNALING CONFIGURING: 1) A                          │
│ MINIMUM PHYSICAL DOWNLINK CONTROL CHANNEL (PDCCH)                                    │
│ MONITORING PERIODICITY THAT SPANS A NUMBER OF SLOTS                                  │
│ ASSOCIATED WITH A SLOT GROUP, AND 2) MONITORING OCCASIONS                            │
│ (MOs) OF DIFFERENT TYPES OF COMMON SEARCH SPACES (CSSS)                              │
│                         WITHIN THE SLOT GROUP                                        │
└─────────────────────────────────────────────────────────────────────────────────────┘
                                                        │
                                                        ▼                                920
┌─────────────────────────────────────────────────────────────────────────────────────┐
│ SELECT AT LEAST ONE MO, FROM THE MOs OF THE DIFFERENT TYPES                          │
│            OF CSSS, TO MONITOR BASED ON A RULE                                       │
└─────────────────────────────────────────────────────────────────────────────────────┘
                                                        │
                                                        ▼                                930
┌─────────────────────────────────────────────────────────────────────────────────────┐
│ MONITOR THE SELECTED AT LEAST ONE MO FOR A PDCCH FROM THE                            │
│                         NETWORK ENTITY                                               │
└─────────────────────────────────────────────────────────────────────────────────────┘
```

FIG. 9

RULES FOR MULTI-SLOT PHYSICAL DOWNLINK CONTROL CHANNEL (PDCCH) MONITORING IN COMMON SEARCH SPACE SETS

CROSS REFERENCE TO RELATED APPLICATIONS

This application claims benefits of and priority to U.S. Provisional Patent Application No. 63/298,576, filed on Jan. 11, 2022, which is assigned to the assignee hereof and herein incorporated by reference in the entirety as if fully set forth below and for all applicable purposes.

INTRODUCTION

Aspects of the present disclosure relate to wireless communications, and more particularly, to techniques for prioritizing monitoring occasions (MOs) for different types of common search spaces (CSSs) configured within a slot group.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE), comprising receiving, from a network entity, signaling configuring 1) a minimum physical downlink control channel (PDCCH) monitoring periodicity that spans a number of slots associated with a slot group, and 2) monitoring occasions (MOs) of different types of common search spaces (CSSs) within the slot group. The method further comprises selecting at least one MO, from the MOs of the different types of CSSs, to monitor based on a rule. The method further comprises monitoring the selected at least one MO for a PDCCH from the network entity.

One aspect provides a method of wireless communication by a network entity, comprising transmitting, to a UE, signaling configuring 1) a minimum PDCCH monitoring periodicity that spans a number of slots associated with a slot group, and 2) MOs of different types of CSSs within the slot group. The method further comprises transmitting a PDCCH in at least one MO, selected from the MOs of the different types of CSSs, based on a rule.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 5A and FIG. 5B depict timelines for slot-based and multi-slot physical downlink control channel (PDCCH) monitoring occasions (MOs).

FIG. 8 depicts a timeline for multi-slot PDCCH monitoring, accordance with certain aspects of the present disclosure.

FIG. 9 illustrates example operations for wireless communications by a first UE, in accordance with certain aspects of the present disclosure.

DETAILED DESCRIPTION

Figure 1:
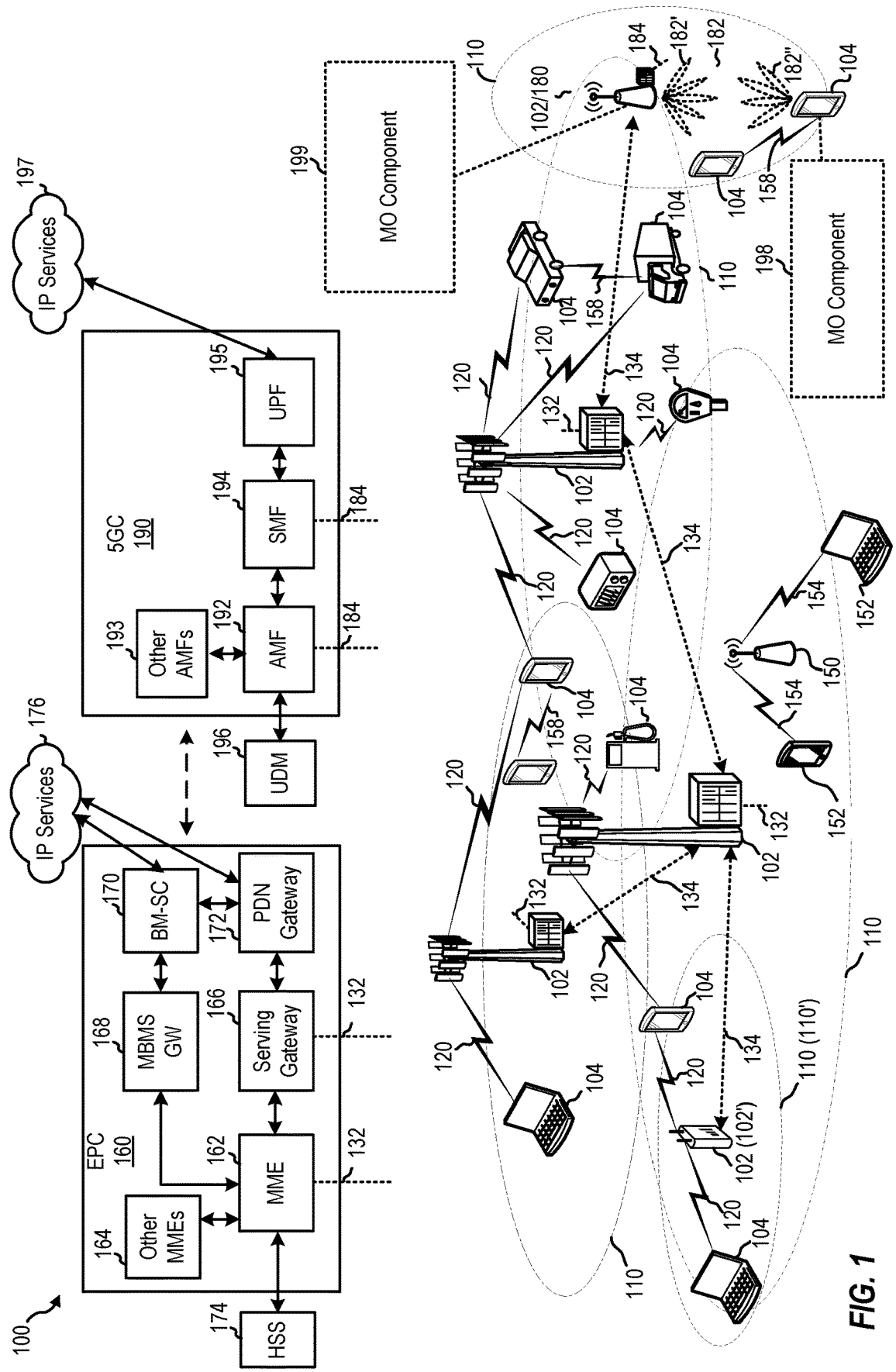
FIG. 1 is a block diagram conceptually illustrating an example wireless communication network.

Aspects of the present disclosure provide apparatuses, methods, processing systems, and computer-readable mediums for physical downlink control channel (PDCCH) monitoring in multi-slot groups (multi-slot PDCCH monitoring). In particular, certain aspects help a user equipment (UE) select which monitoring occasion (MO) to monitor for PDCCH transmissions when MOs for different types of common search spaces (CSSs) are configured within a same slot group.

In current wireless systems with higher carrier frequencies, waveforms with relatively large subcarrier spacings (SCS) may be required to combat phase noise and to fill up large bandwidths. Because slot lengths are typically inversely proportional to SCS, when higher carrier frequencies are deployed, slot length tends to be shortened. Shortened slot lengths can create various issues.

For example, where wireless communication implementation is particularly complex, a UE may have a processing timeline (e.g., for control and data processing) that may not proportionally scale with the shortened slot length. In other words, processing limitations may mean the UE is not be able to meet certain slot-based timelines at shorter slot lengths. For example, while a UE may have enjoyed power saving benefits (e.g., "micro-sleep" operations), at a longer slot length, a processing timeline for complex operations may be comparable to or even overrun the shortened slot length. As a result, certain power-saving operations may not be available when operating at higher frequencies.

Complex operations impacted by shorter slot lengths may include physical downlink channel (PDCCH) monitoring capability, which may be enhanced alongside higher frequency implementation. To mitigate this impact, enhanced monitoring capability may include multi-slot based PDCCH monitoring capability, where a UE may only be configured to monitor for PDCCH transmissions every Xth slot (within a group of X slots, referred to herein as a slot group), instead of every slot. The value of X may depend on a capability of the UE.

In certain cases, monitoring occasions for different types of search spaces may be configured in a slot group, including a UE-specific search space (USS) and one or more common search spaces (CSSs) monitored by multiple UEs. In some cases, MOs for different types of CSSs (e.g., Type0/0A/1/2) may be configured for a slot group.

Issues may arise when there are more than one CSS MO per slot group. Multiple CSS MOs occurring within a slot group may impact the PDCCH processing timeline and induce implementation challenges. For example, blind decoding (BD) and control channel element (CCE) budgets may be shared between CSSs and USSs within a slot group. A large number of CSS MOs in the same slot group may exhaust the BD/CCE budget, leaving little remaining budget for USS MOs, which may in turn limit scheduling flexibility.

Certain aspects of the present disclosure, however, provide a rule-based mechanism for a UE to select what CSS MOs to monitor when MOs for different types of CSSs are configured in a same slot group. As a result, MOs for different types of CSSs may still be configured within a slot group, allowing a UE to meet processing timelines with multi-slot PDCCH monitoring while still maintaining scheduling flexibility.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes monitoring occasion (MO) component 199, which may be configured to communicate with a UE configured for multi-slot PDCCH monitoring, in accordance with aspects of the present disclosure. Wireless network 100 further includes MO component 198, which may be configured for multi-slot PDCCH monitoring, in accordance with aspects of the present disclosure.

Figure 2:
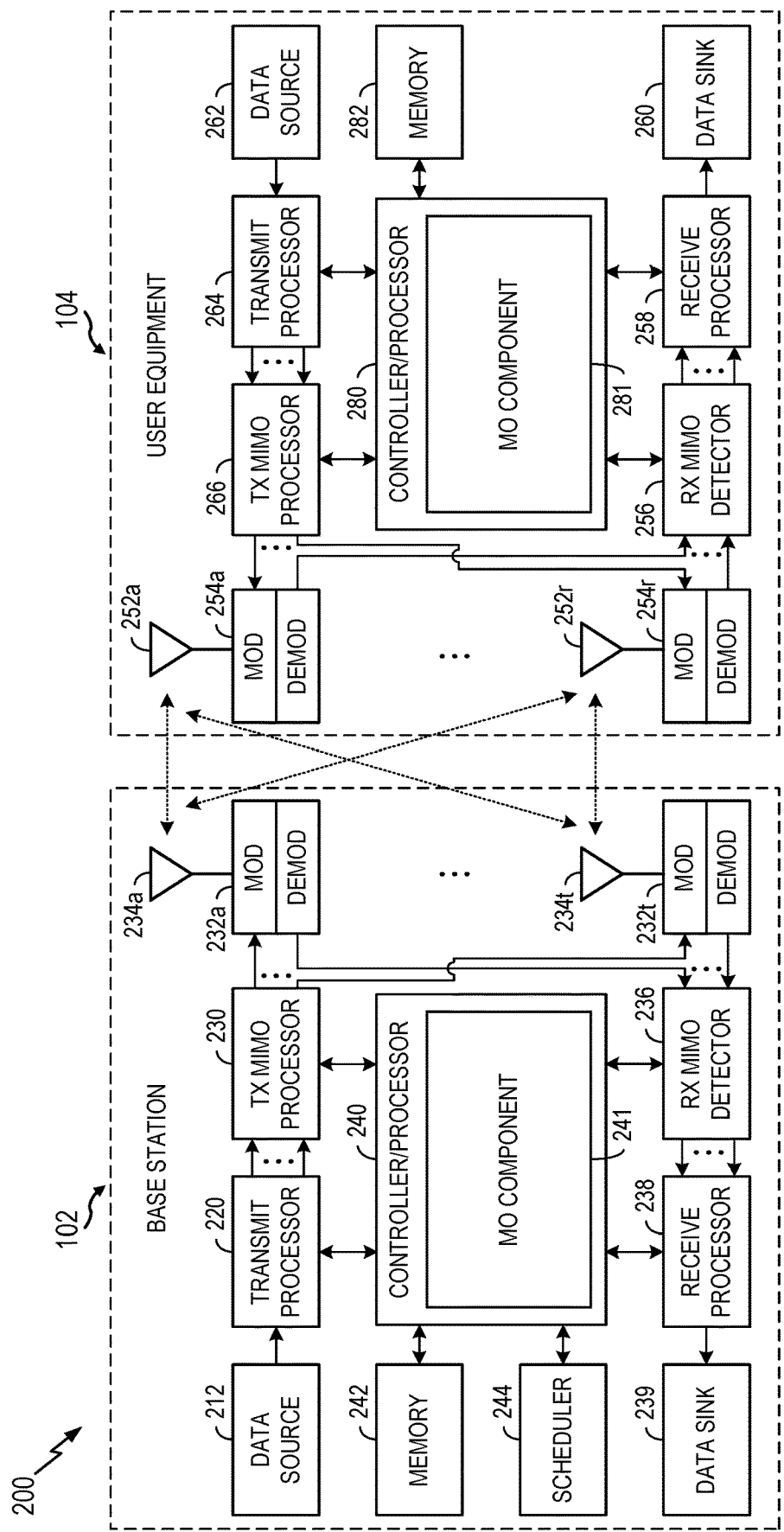
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes MO component 241, which may be representative of MO component 199 of FIG. 1. Notably, while depicted as an aspect of controller/processor 240, MO component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes MO component 281, which may be representative of MO component 198 of FIG. 1. Notably, while depicted as an aspect of controller/processor 280, MO component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

An Overview of Higher Carrier Frequencies

As noted above, in wireless systems with higher carrier frequencies, waveforms with relatively large subcarrier spacings (SCS) may be required to combat phase noise and to fill up large bandwidths. As a result, when higher carrier frequencies are deployed, slot length tends to be shortened. Shortened slot lengths can create various issues.

Figure 4A:
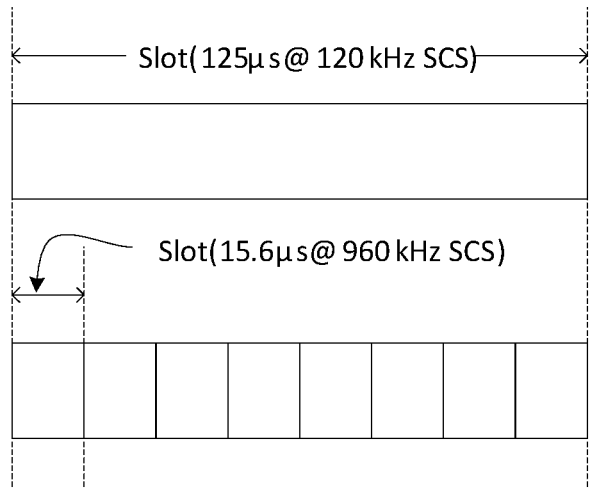
FIG. 4A and FIG. 4B depict slot lengths for various sub-carrier spacings (SCSs) and the effect of slot-length on micro-sleep capability for a wireless device.

For example, for NR applications with high carrier frequencies (e.g., FR2x/FR4 (52.6 GHz-114.25 GHz), an orthogonal frequency-division (OFDM) waveform with large subcarrier spacing (SCS) (e.g., 240 kHz-1.92 MHz) may be useful to combat severe phase noise and to fill up large bandwidth (e.g., 2 GHz). The corresponding slot length may be shortened accordingly. For example, as illustrated in FIG. 4A, in FR2 having 120 kHz SCS, the slot length is 125 μSec, while in FR2-2 having 960 kHz, the slot length is 15.6 μSec.

Figure 4B:
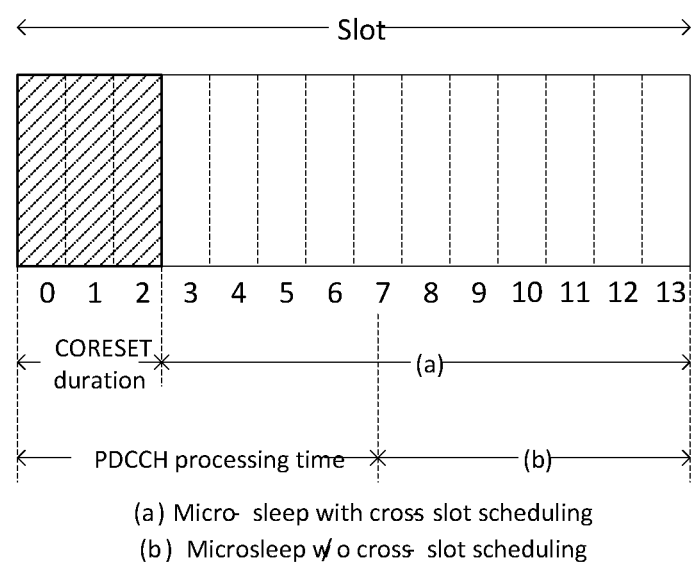

As noted above, due to implementation complexity, a network device (e.g., a UE) may have a processing timeline (e.g., for control and data processing) that may not proportionally scale with the slot length resulting from expanded SCS. In one example illustrated in FIG. 4B, even with same-slot scheduling, the slot durations of FR1/FR2 may allow a UE to enjoy the power saving benefit of micro-sleep (e.g., reducing power by not performing certain processing for some portion of a slot). However, due to the shorter slot lengths in FR4, control channel processing may be comparable to or even overrun the slot length and micro-sleep may not be available. While a UE may be configured to monitor PDCCH in every slot for FR1/FR2, due to limited processing capability, the minimum PDCCH monitoring periodicity for FR4 may need to be greater than one slot (referred to herein as multi-slot PDCCH monitoring).

Overview of Multi-Slot PDCCH Monitoring

PDCCH monitoring capability may be enhanced to accommodate the shorter slot lengths associated with higher SCS. For higher SCSs (e.g., 480 kHz and 960 kHz), a new PDCCH monitoring capability may be introduced to address the challenges of processing PDCCHs in a short slot duration. As noted above, enhanced monitoring capability may include multi-slot based PDCCH monitoring capability, with a minimum PDCCH monitoring periodicity greater than 1 slot (as opposed to slot-based PDCCH monitoring with a minimum PDCCH monitoring periodicity of one slot).

Slot-based PDCCH monitoring capability is illustrated in FIG. 5A, where a PDCCH MO occurs in every slot. Multi-slot PDCCH monitoring capability is illustrated in FIG. 5B.

Based on the UE capability, PDCCH MOs may only occur at least every Xth slot (e.g., X=4) where X is greater than 1, instead of every slot. The supported value(s) of X may depend UE capability.

A base station (BS) may configure various types of PDCCH search spaces (SSs) for a UE to monitor, including Group 1 or Group 2 SS.

For Group 1 SS, the network may configure Type 1 CSS with a dedicated radio resource control (RRC) configuration and Type 3 CSS and UE-specific search spaces (USS). An SS may be monitored within Y consecutive slots within a slot group of X slots. The Y consecutive slots may be located anywhere within the slot group of X slots. Y consecutive slots may or may not be aligned across UEs or with slot n0. The location of the Y consecutive slots within the slot group of X slots is maintained across different slot groups. Blind decoding (BD) attempts for all Group 1 SSs may fall within the same Y consecutive slots.

For a Group 2 SS, there may be a Type 1 CSS without a dedicated RRC configuration. There may also be Type 0, Type 0A, and Type 2 CSS. In this case, SS monitoring locations may be anywhere within a slot group of X slots, with the following exception. BD attempts for Type0-CSS for SSB/CORESET 0 multiplexing pattern 1 and, additionally, for Type0A/2-CSS if searchSpaceId=0 (SS set #0), occur in slots with index n0 and n0+X0, where n0 may be defined by current wireless operating standards (e.g., where X0=4 for 480 kHz, and X0=8 for 960 kHz SCS).

Figure 6:
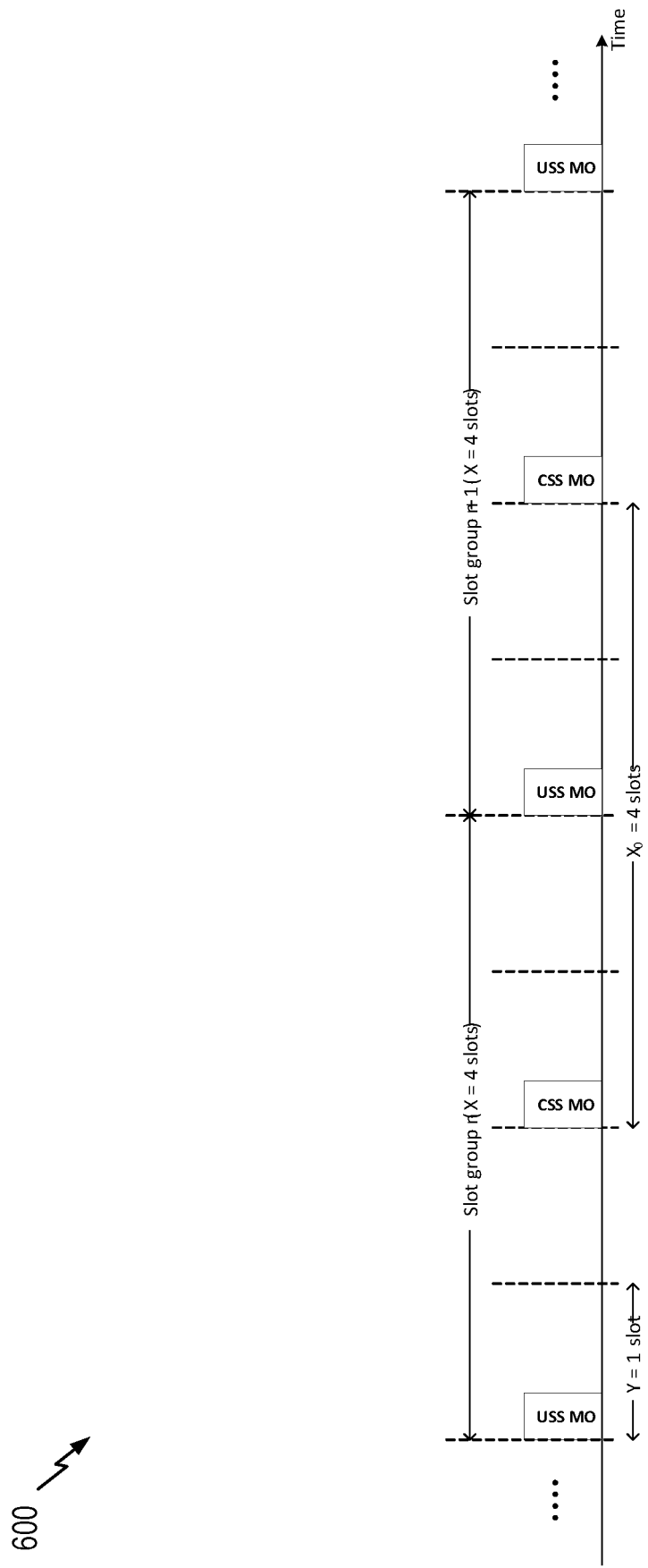
FIG. 6 depicts a timeline for slot-based PDCCH MOs in slot groups configured with a user equipment (UE) specific search spaces (USS) and a common search spaces (CSS).

FIG. 6 illustrates an example of USS and CSS MOs configured within a slot group (where X=4 slots and Y=1 slot).

UEs may support different combinations of X and Y. For example, supported combinations for (X,Y) may include (4,1) for SCS 480 kHz and (8,1) for SCS 960 kHz. A UE capable of multi-slot monitoring may support either SCS. In some cases, a UE may also support combinations for (X,Y) including (4,2) for SCS 480 kHz and (8,4), (4,2), and (4,1) for SCS 960 kHz.

In NR, different types of PDCCH CSSs are defined for different purposes. For example, CSSs are monitored by all UEs to receive broadcast/common messages from the BS during connected mode operation, as well as during idle/inactive mode operation. A PDCCH monitoring occasion (MO) of CSS (a CSS MO) is associated with a synchronization signal block (SSB), in terms of the quasi co-location (QCL) assumption. PDCCHs in CSSs may be repeated on multiple MOs associated with different SSBs (different QCL/beam). Based on SSB measurement (e.g., RSRP measurement), the UE may determine which MO to monitor.

There may be numerous common PDCCHs and CSSs. In one example, a PDCCH may schedule system information block 1 (SIB1). In this case, for slot-based PDCCH monitoring, a UE may monitor a Type0-PDCCH CSS (for control resource set 0 or "CORESET 0" configured in the master information block (MIB)) in a window of two consecutive slots (for SSB and CORESET multiplexing pattern 1) associated with an SSB.

A PDCCH may also schedule other SIBs. In this case, when the Type0A-PDCCH CSS (configured in SIB1) is set to zero (SS set #0), a UE may monitor the same search space set as Type0-PDCCH CSS in a system information window (SI-window).

A PDCCH may also schedule Msg2 or MsgB. In this case, when the Type1-PDCCH CSS (configured in SIB1) is set to zero (SS set #0), a UE may monitor the same search space set as Type0-PDCCH CSS in a random access response (RAR) window. A PDCCH may also schedule paging. In this case, when the Type2-PDCCH CSS (configured in SIB1) is set to zero (SS set #0), a UE may monitor the same search space set as Type0-PDCCH CSS in a paging occasion (PO). In some cases, search space sets other than SS set #0 may be used for Type0A/1/2 CSS. In particular, for Type1/2 CSS, more frequent MOs within the RAR-window or the PO may be needed.

Aspects Related to Rule-Based Multi-Slot PDCCH Monitoring

In certain cases, when different types of CSSs (e.g., Type0/0A/1/2) share the same SS set (e.g., SS set #0), there may be at most one MO for a CSS within a slot group. In other cases, when different types of CSS are separately configured, there may be more than one MO for CSS within a slot group. This may be the case, for example, when SS sets other than SS set #0 are used for Type0A/1/2 CSSs.

As noted above, certain issues may arise when there are more than one CSS MO per slot group. Multiple CSS MOs occurring within a slot group may impact the PDCCH processing timeline and induce implementation challenges. For example, blind decoding (BD) and control channel element (CCE) budgets may be shared between CSSs and USSs within a slot group. A large number of CSS MOs in the same slot group may exhaust the BD/CCE budget, leaving little remaining budget for USS MOs, which may in turn limit scheduling flexibility.

In some cases, certain rules (referred to as counting/overbooking rules) may assign BD/CCE budget to CSS MOs first. Thus, multiple CSS MOs spread over slots within a slot group may impact the PDCCH processing timeline and induce implementation challenges (by exhausting BD/CCE budget).

Aspects of the present disclosure, however, provide a rule-based multi-slot PDCCH monitoring procedure that may help address the issues. The mechanism may allow a UE to select what CSS MOs to monitor when MOs for different types of CSSs are configured in a same slot group. As a result, MOs for different types of CSSs may still be configured within a slot group, allowing a UE to meet processing timelines with multi-slot PDCCH monitoring while still maintaining scheduling flexibility.

Figure 7:
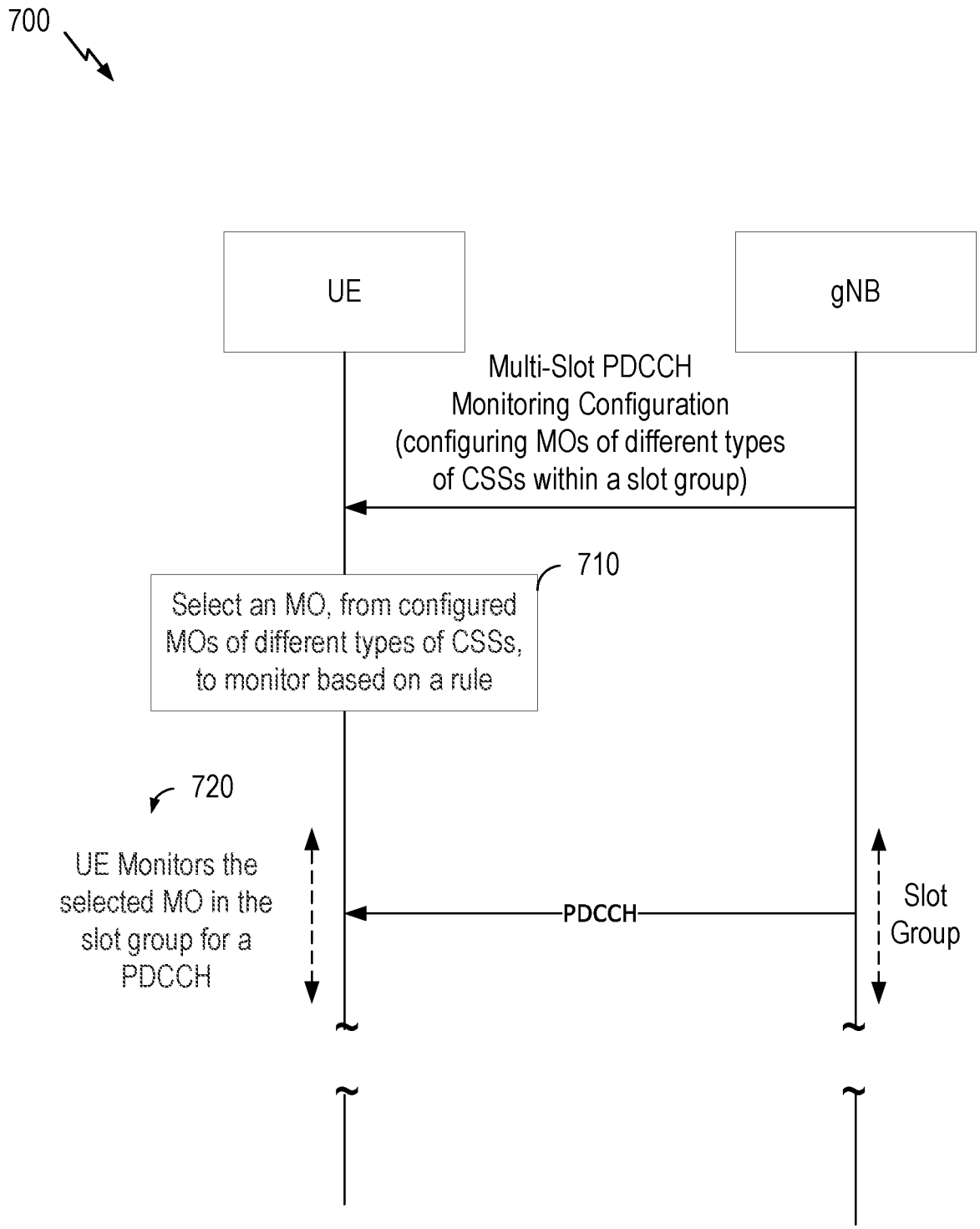
FIG. 7 is a call-flow diagram illustrating example an example of multi-slot PDCCH monitoring, accordance with certain aspects of the present disclosure.

Operation of a UE configured with this rule-based multi-slot PDCCH monitoring mechanism may be understood with reference to the call flow diagram 700 of FIG. 7 and the timing diagram 800 of FIG. 8.

As illustrated in the call-flow diagram 700 of FIG. 7, a gNB may configure the UE for rule-based multi-slot PDCCH monitoring, for example, via RRC signaling. In some cases, the configuration may be part of joint or separate SS/PDCCH configurations. The configuration may configure MOs of different types of CSSs within a slot group. As illustrated, at 710, the UE selects an MO, from the configured MOs of different types of CSSs, to monitor based on a rule. At 720, the UE then monitors the selected MO within the slot group for a PDCCH.

As illustrated by this example, there may be more than one MO for CSSs of different types within a slot group which the UE is configured to monitor. The MOs may or may not be fully overlapping. According to certain aspects of the present disclosure, a rule for CSS monitoring for multi-slot PDCCH MOs within a slot group may set a priority for performing at least one configured MO per slot. Within a slot group, based on assigned priorities, the UE only determines a limited subset (one or more) of the MOs among different types of CSSs to monitor. In some cases, a priority may be assigned for each type of CSS. The priority may be pre-determined in the standard. Alternatively, the priority may be configured by the BS and indicated to the UE via system information or RRC configuration. In some cases, the UE may only monitor a MO for a type of CSS with the highest priority within the slot group.

The timing diagram 800 of FIG. 8 illustrates an example of a UE configured for multi-slot based PDCCH monitoring, according to such a priority-based rule. According to certain aspects of the present disclosure, the UE may monitor a MO for a type of CSS with the highest priority within the slot group. In the illustrated example, the priorities are assumed to be, in descending order: Type1 CSS, Type2 CSS, Type0 CSS, and Type0A CSS. The example also assumes Y is 1 slot. X is 4 slots, which determines a slot group equal to 4 slots. USS MOs occupy the first slot of each slot group, and each slot group is separated by 4 slots.

In slot group n, one USS MO is configured, along with a Type 2 CSS MO and a Type0 CSS MO. Because Type 2 CSS has a higher priority than Type 0 CSS, in this example, the UE selects the Type 2 CSS MO to monitor and does not monitor the Type 0 CSS MO. In slot group n+1, one USS MO is configured, along with a Type 0 CSS MO and a Type0A CSS MO. Because Type 0 CSS has a higher priority than Type 0A CSS, in this example, the UE selects the Type 0 CSS MO to monitor and does not monitor the Type 0A CSS MO.

Because the network (gNB) has knowledge of the rule applied by the UE and the (USS/CSS) MO configuration in any given slot, the network still retains flexibility in scheduling the UE. Further, the network may be able to configure what priorities are assigned to the different types of CSSs and/or can control the MO configuration in a given slot group.

The rule-based multi-slot PDCCH monitoring described herein may also help address potential BD/CCE budget issues resulting from different CSS types configured in a slot group. For example, for BD/CCE counting purposes, only the BD/CCE assigned to the CSS MOs are actually monitored, based on the rule.

In some cases, if two different types of CSSs share the same SS set (e.g., SS set #0), a default rule may be applied as a default or fallback procedure (e.g., an existing legacy/Rel-15 monitoring rule may be applied). In such cases, a UE may monitor downlink control information (DCI) formats, in the same MO, with cyclic redundancy check (CRC) scrambled by different radio network temporary identifiers (RNTIs) corresponding to the type/purpose of corresponding PDCCH. For example, the UE may be configured to monitor for DCI formats with CRC scrambled by system information RNTI (SI-RNTI), random access RNTI (RA-RNTI), random access channel message B RNTI (MsgB-RNTI), or physical RNTI (P-RNTI)) in the same MO. The UE may not expect to process more than one DCI format with CRC scrambled by different type of RNTI per slot.

Example Methods

FIG. 9 illustrates example operations 900 for wireless communications by a UE, in accordance with certain aspects of the present disclosure. For example, operations 900 may be performed by a user equipment (UE) 104 of FIG. 1 for PDCCH monitoring.

Operations 900 begin, at 910, by receiving, from a network entity, signaling configuring: 1) a minimum physical downlink control channel (PDCCH) monitoring periodicity that spans a number of slots associated with a slot group, and 2) monitoring occasions (MOs) of different types of common search spaces (CSSs) within the slot group.

At 920, a UE selects at least one MO, from the MOs of the different types of CSSs, to monitor based on a rule.

At 930, a UE monitors the selected at least one MO for a PDCCH from the network entity.

Figure 10:
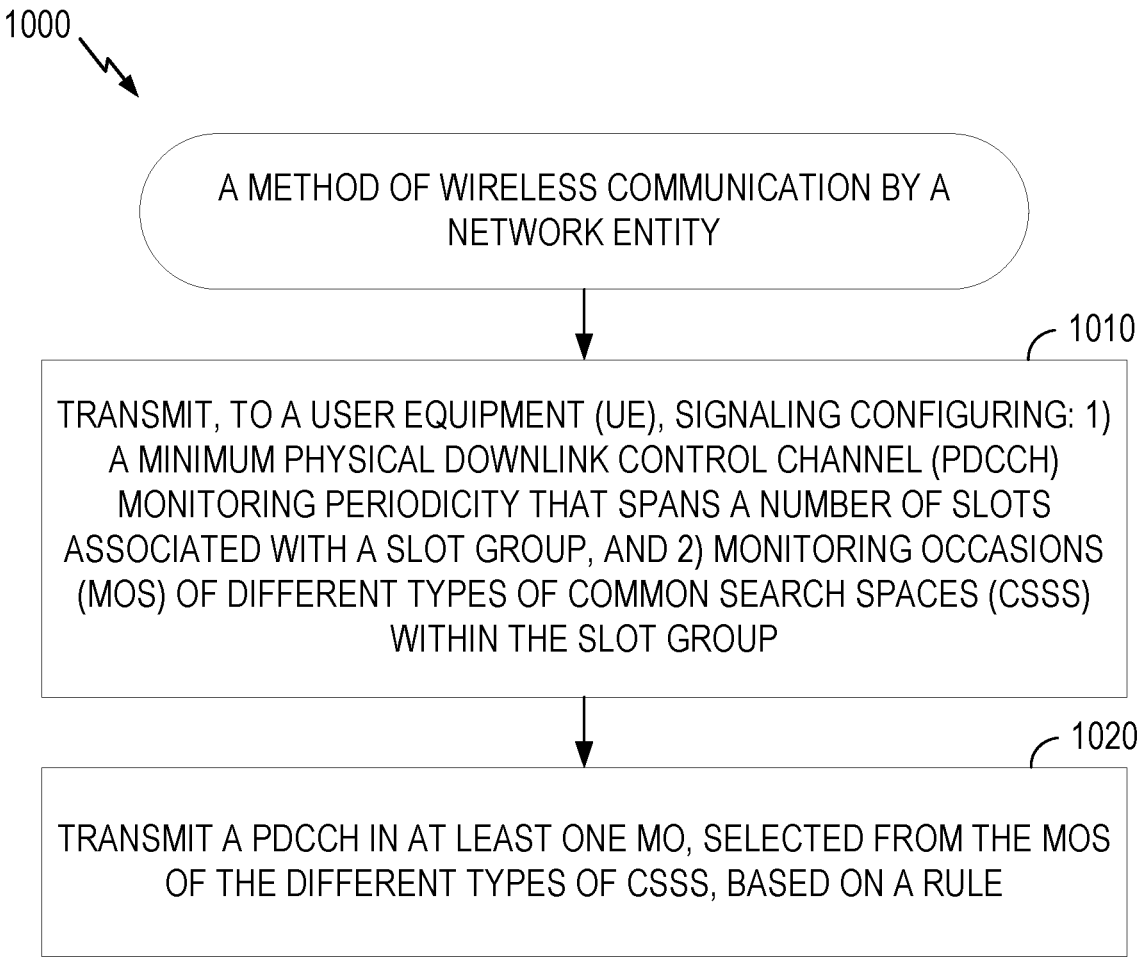
FIG. 10 illustrates example operations for wireless communications by a first wireless entity, in accordance with certain aspects of the present disclosure.

FIG. 10 illustrates example operations 1000 for wireless communications by a wireless entity, in accordance with certain aspects of the present disclosure. For example, operations 1000 may be performed by a base station (BS) 102 of FIG. 1 for PDCCH monitoring.

Operations 1000 begin, at 1010, by transmitting, to a UE, signaling configuring: 1) a minimum PDCCH monitoring periodicity that spans a number of slots associated with a slot group, and 2) MOs of different types of CSSs within the slot group.

At 1020, a network entity may transmit a PDCCH in at least one MO, selected from the MOs of the different types of CSSs, based on a rule.

Example Wireless Communication Devices

Figure 11:
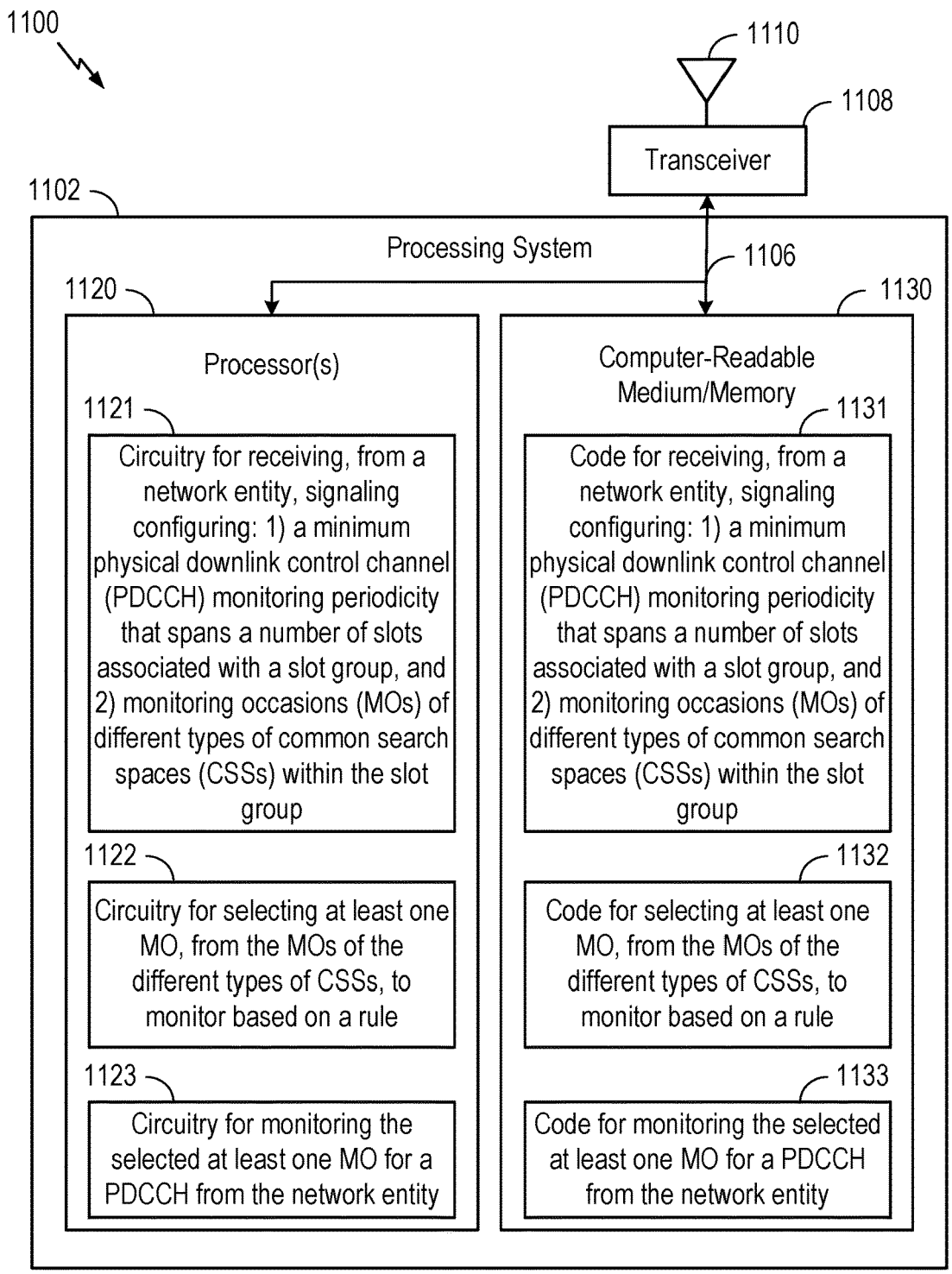
FIG. 11 depicts aspects of an example communications device.

FIG. 11 depicts an example communications device 1100 that includes various components operable, configured, or adapted to perform operations for the techniques disclosed herein, such as the operations depicted and described with respect to FIG. 9. In some examples, communication device 1100 may be a user equipment 104 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 9, or other operations for performing the various techniques discussed herein for monitoring a PDCCH based on a configured MO.

In the depicted example, computer-readable medium/memory 1130 stores code 1131 for receiving, from a network entity, signaling configuring: 1) a minimum PDCCH monitoring periodicity that spans a number of slots associated with a slot group, and 2) MOs of different types of CSSs within the slot group, code 1132 for selecting at least one MO, from the MOs of the different types of CSSs, to monitor based on a rule, and code 1133 for monitoring the selected at least one MO for a PDCCH from the network entity.

In the depicted example, the one or more processors 1120 include circuitry configured to implement the code stored in the computer-readable medium/memory 1130, including circuitry 1121 for receiving, from a network entity, signaling configuring: 1) a minimum PDCCH monitoring periodicity that spans a number of slots associated with a slot group, and 2) MOs of different types of CSSs within the slot group, circuitry 1122 for selecting at least one MO, from the MOs of the different types of CSSs, to monitor based on a rule, and circuitry 1123 for monitoring the selected at least one MO for a PDCCH from the network entity.

Various components of communications device 1100 may provide means for performing the methods described herein, including with respect to FIG. 9.

In some examples, means for transmitting or sending (or means for outputting for transmission) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the user equipment 104 illustrated in FIG. 2 and/or transceiver 1108 and antenna 1110 of the communication device 1100 in FIG. 11.

In some examples, means for receiving, selecting, and/or monitoring may include various processing system components, such as: the one or more processors 1120 in FIG. 11, or aspects of the user equipment 104 depicted in FIG. 2, including receive processor 258, transmit processor 264, TX MIMO processor 266, and/or controller/processor 280 (including MO component 281).

Notably, FIG. 11 is an example, and many other examples and configurations of communication device 1100 are possible.

Figure 12:
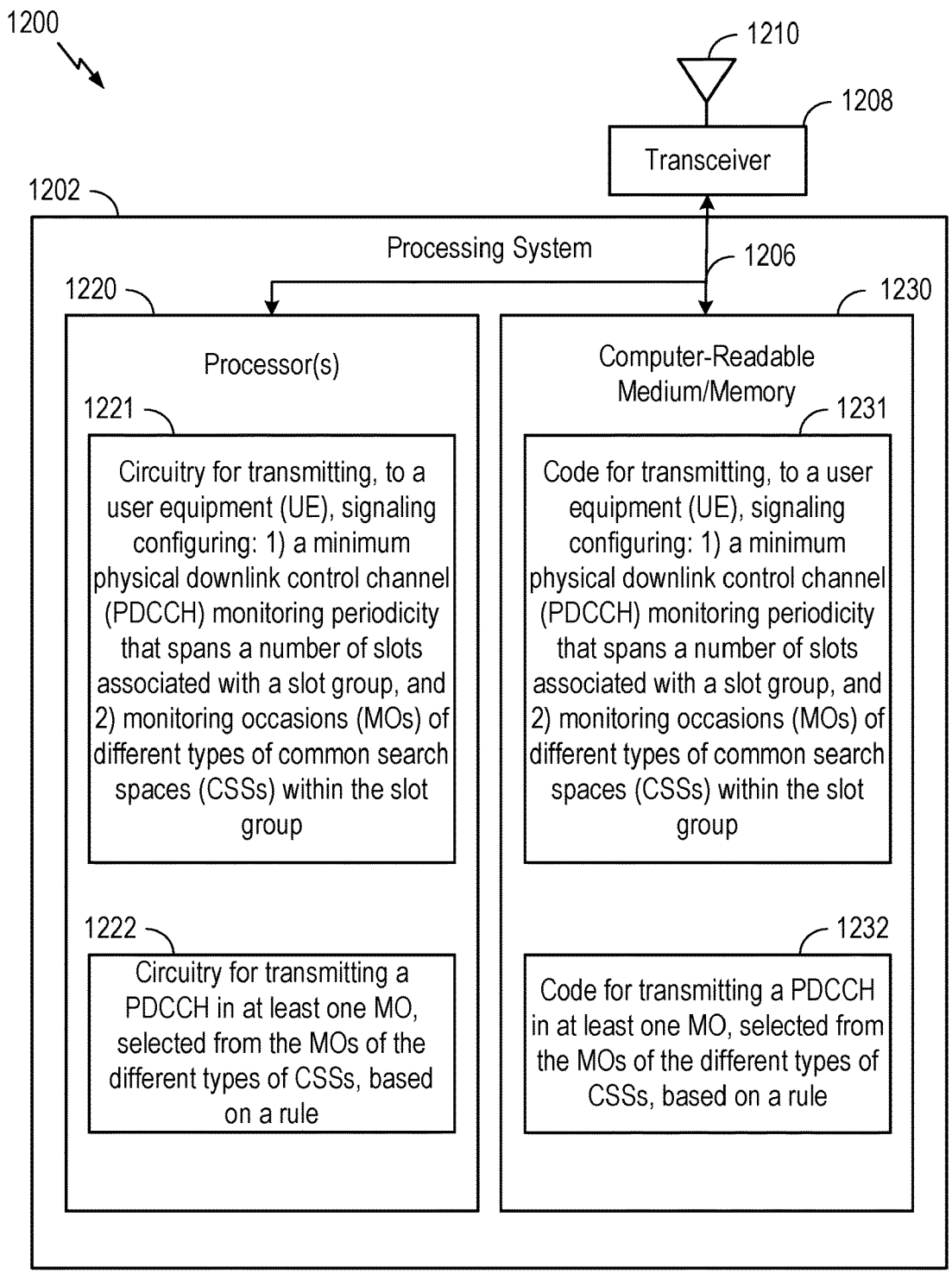
FIG. 12 depicts aspects of an example communications device.

FIG. 12 depicts an example communications device 1200 that includes various components operable, configured, or adapted to perform operations for the techniques disclosed herein, such as the operations depicted and described with respect to FIG. 10. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 10, or other operations for performing the various techniques discussed herein for configuring a MO for a common search space (CSS) type.

Transmitting, to a UE, signaling configuring: 1) a minimum PDCCH monitoring periodicity that spans a number of slots associated with a slot group, and 2) MOs of different types of CSSs within the slot group; and Transmitting a PDCCH in at least one MO, selected from the MOs of the different types of CSSs, based on a rule In the depicted example, computer-readable medium/memory 1230 stores code 1231 for transmitting, to a UE, signaling configuring: 1) a minimum PDCCH monitoring periodicity that spans a number of slots associated with a slot group, and 2) MOs of different types of CSSs within the slot group, and code 1232 for transmitting a PDCCH in at least one MO, selected from the MOs of the different types of CSSs, based on a rule.

In the depicted example, the one or more processors 1220 include circuitry configured to implement the code stored in the computer-readable medium/memory 1230, including circuitry 1221 for transmitting, to a UE, signaling configuring: 1) a minimum PDCCH monitoring periodicity that spans a number of slots associated with a slot group, and 2) MOs of different types of CSSs within the slot group, and circuitry 1222 for transmitting a PDCCH in at least one MO, selected from the MOs of the different types of CSSs, based on a rule.

Various components of communications device 1200 may provide means for performing the methods described herein, including with respect to FIG. 10.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna(s) 234 of the base station illustrated in FIG. 2 and/or transceiver 1208 and antenna 1210 of the communication device 1200 in FIG. 12.

In some examples, means for transmitting may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including MO component 241).

Notably, FIG. 12 is an example, and many other examples and configurations of communication device 1200 are possible.

Example Clauses

Implementation examples are described in the following numbered clauses:

Clause 1: A method of wireless communication by a user equipment (UE), comprising receiving, from a network entity, signaling configuring: 1) a minimum physical downlink control channel (PDCCH) monitoring periodicity that spans a number of slots associated with a slot group, and 2) monitoring occasions (MOs) of different types of common search spaces (CSSs) within the slot group, selecting at least one MO, from the MOs of the different types of CSSs, to monitor based on a rule, and monitoring the selected at least one MO for a PDCCH from the network entity.

Clause 2: The method of clause 1, wherein the signaling also configures a number of consecutive slots to monitor within the slot group.

Clause 3: The method of clause 2, wherein at least one of the number of slots associated with the slot group or the number of consecutive slots to monitor within the group depends on a capability of the UE.

Clause 4: The method of any one of clauses 1-3, wherein the different types of common search spaces (CSSs) comprise at least one of a first type of CSS configured, via a master information block (MIB), for transmitting a PDCCH scheduling a first system information block (SIB), or a second type of CSS configured, via the first SIB, for transmitting a PDCCH scheduling at least a second SIB.

Clause 5: The method of any one of clauses 1-4, wherein the different types of common search spaces (CSSs) comprise at least one of a first type of CSS configured, via a system information block (SIB), for transmitting a PDCCH scheduling a random access channel (RACH) message within a random access response (RAR) window, or a second type of CSS configured, via the SIB, for transmitting a PDCCH scheduling paging in a paging occasion (PO).

Clause 6: The method of any one of clauses 1-5, wherein priorities are assigned to each of the different types of CSSs with MOs configured in the slot group; and according to the rule, the UE selects the at least one MO to monitor based on the priorities.

Clause 7: The method of clause 6, wherein the priorities are configured by the network entity via at least one of system information or radio resource control (RRC) signaling.

Clause 8: The method of any one of clause 5-6, wherein, according to the rule, the UE selects an MO with a highest priority from the different types of CSSs with MOs configured in the slot group.

Clause 9: The method of any one of clauses 1-8, further comprising, for at least one of blind decoding budget or control channel element (CCE) budget monitoring purposes counting only the at least one MO, selected based on the rule, and not counting other MOs of the different types of CSSs with MOs configured in the slot group.

Clause 10: The method of any one of clauses 1-9, wherein, if at least two of the different types of CSSs share an SS set, the UE is configured to monitor downlink control information (DCI) formats with cyclic redundancy checks (CRCs) scrambled by different types of radio network temporary identifiers (RNTIs) associated with the at least two different types of CSSs that share the SS set, and expect to process only one of the DCI formats with a CRC scrambled by one of the different types of RNTIs within the slot group.

Clause 11: A method of wireless communication by a network entity, comprising transmitting, to a user equipment (UE), signaling configuring: 1) a minimum physical downlink control channel (PDCCH) monitoring periodicity that spans a number of slots associated with a slot group, and 2) monitoring occasions (MOs) of different types of common search spaces (CSSs) within the slot group, and transmitting a PDCCH in at least one MO, selected from the MOs of the different types of CSSs, based on a rule.

Clause 12: The method of clause 11, wherein the signaling also configures a number of consecutive slots to monitor within the slot group.

Clause 13: The method of clause 12, wherein at least one of the number of slots associated with the slot group or the number of consecutive slots to monitor within the group depends on a capability of the UE.

Clause 14: The method of any one of clauses 11-13, wherein the different types of common search spaces (CSSs) comprise at least one of a first type of CSS configured, via a master information block (MIB), for transmitting a PDCCH scheduling a first system information block (SIB), or a second type of CSS configured, via the first SIB, for transmitting a PDCCH scheduling at least a second SIB.

Clause 15: The method of any one of clauses 11-14, wherein the different types of common search spaces (CSSs) comprise at least one of a first type of CSS configured, via a system information block (SIB), for transmitting a PDCCH scheduling a random access channel (RACH) message within a random access response (RAR) window, or a second type of CSS configured, via the SIB, for transmitting a PDCCH scheduling paging in a paging occasion (PO).

Clause 16: The method of any one of clauses 11-15, wherein priorities are assigned to each of the different types of CSSs with MOs configured in the slot group; and according to the rule, the network entity selects the at least one MO based on the priorities.

Clause 17: The method of clause 16, wherein the priorities are configured by the network entity via at least one of system information or radio resource control (RRC) signaling.

Clause 18: The method of any one of clauses 16-17, wherein, according to the rule, the network entity selects an MO with a highest priority from the different types of CSSs with MOs configured in the slot group.

Clause 19: The method of any one of clauses 11-18, further comprising, for at least one of blind decoding budget or control channel element (CCE) budget monitoring purposes: counting only the at least one MO, selected based on the rule, and not counting other MOs of the different types of CSSs with MOs configured in the slot group.

Clause 20: The method of any one of clauses 11-19, wherein, if at least two of the different types of CSSs share an SS set, the network entity is configured to: transmit only one PDCCH with a downlink control information (DCI) format with cyclic redundancy check (CRC) scrambled by one of different types of radio network temporary identifiers (RNTIs) associated with the at least two different types of CSSs that share the SS set.

Clause 21: An apparatus, comprising: a memory comprising executable instructions; one or more processors configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by one or more processors of an apparatus, cause the apparatus to perform a method in accordance with any one of Clauses 1-20.

Clause 24: A computer program product embodied on a computer-readable storage medium comprising code for performing a method in accordance with any one of Clauses 1-20.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of prioritizing monitoring occasions (MOs) for a type of common search space (CSS) within a slot group in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment (UE), the method comprising:
   receiving, from a network entity, signaling configuring:
      a minimum physical downlink control channel (PDCCH) monitoring periodicity that spans a number of slots associated with a slot group; and
      a plurality of monitoring occasions (MOs) of different types of common search spaces (CSSs) within the slot group;
   selecting, based on a rule, a subset of one or more MOs, from the plurality of MOs, to monitor, wherein the subset of one or more MOs is associated with a subset of the different types of CSSs within the slot group; and
   monitoring the subset of one or more MOs for a PDCCH from the network entity, wherein:
      priorities are assigned to each of the different types of CSSs within the slot group; and
      the selecting, based on the rule, comprises selecting the subset of one or more MOs to monitor based on the priorities.

2. The method of claim 1, wherein the signalling further configures a number of consecutive slots to monitor within the slot group.

3. The method of claim 2, wherein at least one of the number of slots associated with the slot group or the number of consecutive slots to monitor within the slot group depends on a capability of the UE.

4. The method of claim 1, wherein the different types of CSSs comprise at least one of:
   a first type of CSS configured, via a master information block (MIB), for transmitting a PDCCH scheduling a first system information block (SIB); or
   a second type of CSS configured, via the first SIB, for transmitting a PDCCH scheduling at least a second SIB.

5. The method of claim 1, wherein the different types of CSSs comprise at least one of:
   a first type of CSS configured, via a system information block (SIB), for transmitting a PDCCH scheduling a random access channel (RACH) message within a random access response (RAR) window; or
   a second type of CSS configured, via the SIB, for transmitting a PDCCH scheduling paging in a paging occasion (PO).

6. The method of claim 1, wherein, if at least two of the different types of CSSs within the slot group share a synchronization signal (SS) set:
   the monitoring for the PDCCH comprises monitoring for downlink control information (DCI) formats with cyclic redundancy checks (CRCs) scrambled by different types of radio network temporary identifiers (RNTIs) associated with the at least two different types of CSSs within the slot group that share the SS set; and
   expecting to process only one of the DCI formats with a CRC scrambled by one of the different types of RNTIs.

7. The method of claim 1, wherein the priorities are configured by the network entity via at least one of system information or radio resource control (RRC) signaling.

8. The method of claim 7, wherein the selecting, based on the rule, the subset of one or more MOs comprises selecting an MO with a highest priority from the priorities assigned to the different types of CSSs within the slot group.

9. The method of claim 1, further comprising:
   counting, for at least one of a blind decoding budget or a control channel element (CCE) budget, only the subset of one or more MOs; and
   not counting, for the at least one of the blind decoding budget or the CCE budget, other MOs of the plurality of MOs.

10. An apparatus for wireless communication by a user equipment (UE), comprising:
    memory storing computer-executable instructions; and
    at least one processor coupled with the memory and configured to, individually or collectively, execute the computer-executable instructions to cause the UE to:
       receive, from a network entity, signaling configuring:
          a minimum physical downlink control channel (PDCCH) monitoring periodicity that spans a number of slots associated with a slot group; and
          a plurality of monitoring occasions (MOs) of different types of common search spaces (CSSs) within the slot group;
       select, based on a rule, a subset of one or more MOs, from the plurality of MOs, to monitor, wherein the subset of one or more MOs is associated with a subset of the different types of CSSs within the slot group; and
    monitor the subset of one or more MOs for a PDCCH from the network entity, wherein:
       priorities are assigned to each of the different types of CSSs within the slot group; and
       the selecting, based on the rule, comprises selecting the subset of one or more MOs to monitor based on the priorities.

11. A method of wireless communication by a network entity, the method comprising:
    transmitting, to a user equipment (UE), signaling configuring:
       a minimum physical downlink control channel (PDCCH) monitoring periodicity that spans a number of slots associated with a slot group; and
       a plurality of monitoring occasions (MOs) of different types of common search spaces (CSSs) within the slot group;
    selecting, based on a rule, a subset of one or more MOs, from the plurality of MOs, to transmit a PDCCH, wherein the subset of one or more MOs is associated with a subset of the different types of CSSs within the slot group; and
    transmitting the PDCCH in the subset of one or more MOs, wherein:

priorities are assigned to each of the different types of CSSs within the slot group; and the selecting, based on the rule, comprises selecting the subset of one or more MOs based on the priorities.

12. The method of claim 11, wherein the signalling further configures a number of consecutive slots to monitor within the slot group.

13. The method of claim 12, wherein at least one of the number of slots associated with the slot group or the number of consecutive slots to monitor within the slot group depends on a capability of the UE.

14. The method of claim 11, wherein the different types of CSSs comprise at least one of:
- a first type of CSS configured, via a master information block (MIB), for transmitting a PDCCH scheduling a first system information block (SIB); or
- a second type of CSS configured, via the first SIB, for transmitting a PDCCH scheduling at least a second SIB.

15. The method of claim 11, wherein the different types of CSSs comprise at least one of:
- a first type of CSS configured, via a system information block (SIB), for transmitting a PDCCH scheduling a random access channel (RACH) message within a random access response (RAR) window; or
- a second type of CSS configured, via the SIB, for transmitting a PDCCH scheduling paging in a paging occasion (PO).

16. The method of claim 11, wherein, if at least two of the different types of CSSs within the slot group share a synchronization signal (SS) set, the transmitting the PDCCH comprises transmitting only one PDCCH with a downlink control information (DCI) format with cyclic redundancy check (CRC) scrambled by one of different types of radio network temporary identifiers (RNTIs) associated with the at least two different types of CSSs within the slot group that share the SS set.

17. The method of claim 11, further comprising configuring the priorities via at least one of system information or radio resource control (RRC) signaling.

18. The method of claim 11, wherein the selecting, based on the rule, the subset of one or more MOs comprises selecting an MO with a highest priority from the priorities assigned to the different types of CSSs within the slot group.

19. The method of claim 11, further comprising:
- counting, for at least one of a blind decoding budget or a control channel element (CCE) budget, only the subset of one or more MOs; and
- not counting, for the at least one of the blind decoding budget or the CCE budget, other MOs of the plurality of MOs.

20. An apparatus for wireless communication by a network entity, comprising:
memory storing computer-executable instructions; and
transmit, to a user equipment (UE), signaling configuring:
- a minimum physical downlink control channel (PDCCH) monitoring periodicity that spans a number of slots associated with a slot group; and
- a plurality of monitoring occasions (MOs) of different types of common search spaces (CSSs) within the slot group;

select, based on a rule, a subset of one or more MOs, from the plurality of MOs, to transmit a PDCCH, wherein the subset of one or more MOs is associated with a subset of the different types of CSSs within the slot group; and transmit the PDCCH in the subset of one or more MOs, wherein:

priorities are assigned to each of the different types of CSSs within the slot group; and the selecting, based on the rule, comprises selecting the subset of one or more MOs based on the priorities.

* * * * *